Aug. 15, 1939  C. B. NOELTING ET AL  2,169,882
CASTER SOCKET
Filed March 30, 1936  2 Sheets-Sheet 1

INVENTORS.
CLARENCE B. NOELTING.
WILLIAM H. NOELTING.
BY
Lockwood Goldsmith & Galt
ATTORNEYS.

Aug. 15, 1939. C. B. NOELTING ET AL 2,169,882
CASTER SOCKET
Filed March 30, 1936 2 Sheets-Sheet 2

INVENTORS,
CLARENCE B. NOELTING.
WILLIAM H. NOELTING.
BY
Lockwood Goldsmith & Galt
ATTORNEYS.

Patented Aug. 15, 1939

2,169,882

UNITED STATES PATENT OFFICE 2,169,882

CASTER SOCKET

Clarence B. Noelting and William H. Noelting, Evansville, Ind., assignors to Faultless Caster Corporation, Evansville, Ind., a corporation Application March 30, 1936, Serial No. 71,652

17 Claims. (Cl. 16—38)

This invention relates to a caster socket for tubular legs and particularly one wherein the socket frictionally is retained within the leg when not subjected to load and which at the same time is adapted to frictionally retain a caster stem within the socket.

The chief object of the invention is to provide a socket which is adapted to coaxially support within the socket a caster stem or pintle and retain within said socket said pintle by means of an elongated, cylindrical, friction type retainer, thereby insuring frictional retention of the stem through a long period of operation, it being understood that heretofore with this broad class of sockets, stem retention becomes progressively delinquent, due to lateral movement of the stem wearing or reducing the life of the stem retainer employed in the socket, since the latter has been of the ring or circular line contact type, with relation to the stem.

Another feature of the invention in addition to the accomplishment of the foregoing object is the formation of the socket, whereby the upper end of the pintle when seated therein, is constrained against side thrust.

A third and highly desirable feature of the invention is that all of the parts of the socket may be fabricated from plate, ribbon or strip stock and if and when desired in the preferred and more complicated form of the invention, two cooperating portions may be formed from concentric portions of the same piece of metal by properly limiting the interior diameter of the skirt and the exterior diameter of the lower pintle centering plate.

A further feature of the invention resides in the specific form of the spring retainer which in its simplest form, includes an elongated split sleeve forming a cylindrical, tubular, friction-gripping bearing, the opposite ends of which are outwardly flared, it being possible to fabricate said retainer from ribbon stock.

The full nature of the invention will be understood from the accompanying and the following description and claims:

In the drawings, Fig. 1 is a central sectional view through the preferred and more complicated form of the invention.

Figure 1:
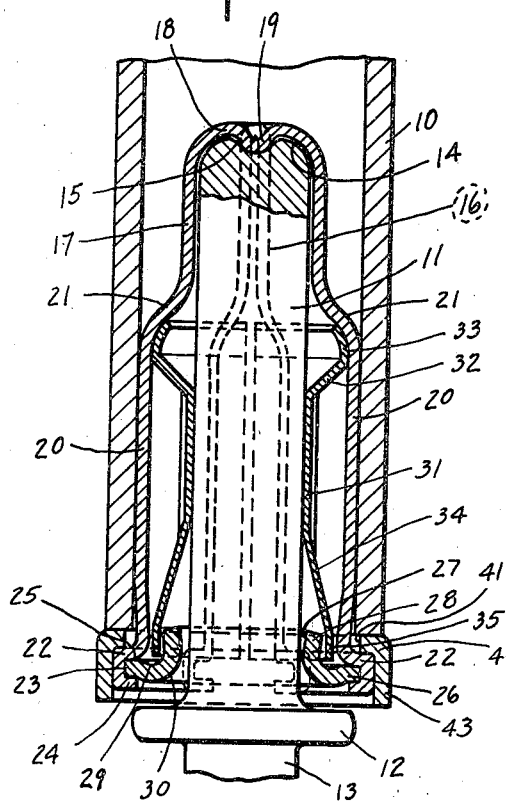
Figure 3:
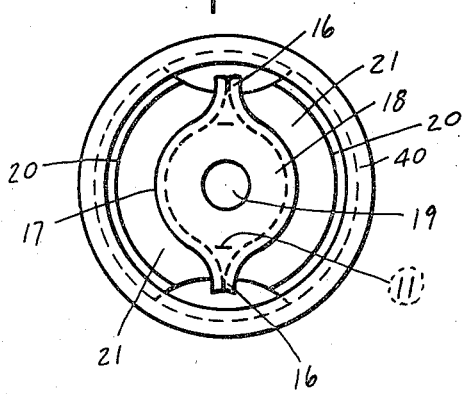
Fig. 3 is a top plan view of the invention shown in Fig. 1 with the leg omitted.

In Fig. 1 of the drawings, 10 indicates a tubular leg. This leg upon its interior may have a locked joint, in which event, as shown in Fig. 3, the joint portion of the leg would not interfere with the coaxial mounting of the socket within the leg. 11 indicates an elongated pintle having an enlargement 12 positioned below the socket and an extension 13 which mounts the horn of a caster in any desired manner, such mounting usually being associated with the enlargement 12 as is well understood in the caster art. In the present form of the invention, the pintle 11 is provided at its upper end with a rounded portion 14 which coaxially is recessed as at 15.

The socket member proper includes an elongated strap which at its midportion, is folded together to form the wings, see Fig. 3, 16 and the substantially tubular pintle aligning elongated portion 17, the latter at its upper end terminating in a rounded top bearing 18 which, in Fig. 1, is shown coaxially indented as at 19 for cooperative reception by the depression 15 in the stem.

A pair of arms 20 of the strap are elongated and formed arcuate in transverse section. Their upper ends are inwardly and upwardly directed, forming the arched portions 21, see Fig. 1. The lower ends are outwardly directed as at 22 and this extension is then directed downwardly and inwardly as at 23 and 24 respectively to form a groove 25. The load of the leg is transmitted to the outwardly extending portion 22.

A centering plate 26 is centrally apertured as at 27 for pintle guidance and reception and it also prevents undue cocking of the pintle in the socket. In the present form of the invention, the aperture 27 is defined by an upward extension 28 on said plate in the form of a collar. The peripheral portion of the plate 26 is seatable in the grooves 25. In this form of the invention, the plate between the aperture and its nested portion is provided with an annular grooved arrangement 29 and the formation is such that the entrance to the aperture is rounded as at 30.

The pintle retainer is of split sleeve type and includes a relatively elongated tubular, cylindrical portion 31 which for an appreciable length of the pintle is in frictional engagement therewith. Each end of the cylindrical sleeve portion is outwardly and oppositely directed, the upper end 32 being flared outwardly and upwardly and in the present form terminating in a return bend arrangement 33 which has an exterior upper surface substantially conforming to the adjacent interior arched surface with which it is in operative engagement. The lower outwardly directed portion 34 is similarly flared and terminates in a substantially tubular and concentric portion 35 which is positionable between the collar 28 and the adjacent lower portion of the arms 20.

When the socket, thus described, is inserted into the tubular leg, the exterior surfaces of the arms 20 frictionally engage the interior of the leg and frictionally retain the socket within the leg. This is irrespective whether there is load on the leg or not.

When the pintle is inserted in the socket with the sleeve retainer therein, the rounded head 14 of the stem or pintle readily is locatable in the aperture 27 by reason of the curvature 30 in the plate 26. By reason of the flared portion 34 of the sleeve and the curvature 14 of the top of the stem, the pintle is readily insertable within the sleeve retainer and is forced upwardly therethrough, expanding said split retainer in this action, and the movement is continued until the top of the stem engages the top of the top bearing of the socket. In this position, the stem is frictionally retained within the socket and by reason of the elongated friction bearing provided, the stem may readily rotate in the socket when necessary without dropping out.

The upper end of the stem, as will be evident from an examination of Fig. 1, is prevented from material lateral movement by reason of the elongated tubular portion 17 of the socket which absorbs the side thrust and by the coaxial portions 15 and 19.

Undue expansion of the spring retainer is prevented by the upper diverging end of the same engaging the upper portion or rather arched portion of the socket and, of course, downward movement of the spring retainer which might be effected in its expansion, is limited by the lower outwardly directed end of the spring retainer engaging the plate portion. Whenever clearances are relatively small, it may be that outward expansion of the spring retainer is prevented by portion 35 of the spring retainer engaging the interior surface of the adjacent lower arm portions. Naturally, undue inward or collapsing movement of the spring retainer is prevented by linear contact of the edges of the split portion, if that be of a minimum, or if it be material, then such inward contraction, which in the normal constrained position is prevented by portion 35 engaging the exterior of the collar 28 in the inward contracting movement of the spring when the pintle is not seated therein.

To secure a more ornamental appearance and for protective purposes, a shield is provided. In its simplest form, it includes a plate 40 apertured at 41 to telescopically receive the socket, the enlargements 22 bearing upon the underface of the plate 40. For concealment purposes, there may be provided the outward extension or skirt 43 which telescopes the grooved ends of the arms. This construction, particularly the plate portion 40, forms a substantially continuous peripheral bearing face, upon which may bear the entire lower end of the leg 10 as illustrated, and by reason of the apertured wall, separating movement of the grooved ends of the arms to release plate 26 is prevented.

In certain forms of the invention, when it is desired to mask or conceal a rough lower edge of a tubular leg plate 40 with its skirt 43 may be inverted and in that event, it will still retain the arms against separation but while not concealing the plate nesting potions of said arms, it will peripherally encompass the lower end of the leg. However, it is preferred that the cup-shaped washer, before mentioned, be associated with the socket in the relationship shown in Fig. 1.

In certain instances the sleeve may swivel with the stem in the socket while in other instances the sleeve may not but then the stem will swivel in the sleeve while the sleeve prevents axial separation of the pintle due to the elongated friction contact therewith.

Figure 2:
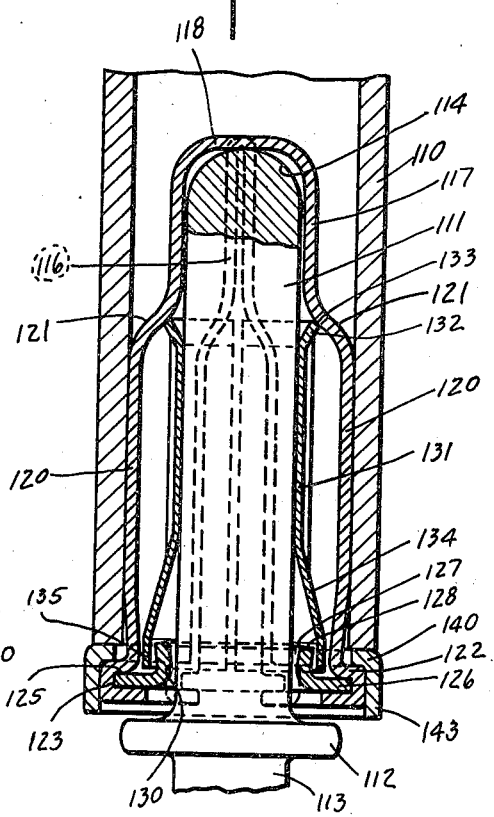
Fig. 2 is a similar view through one of the simplest forms of the invention.

In Fig. 2 a simplified form of construction is illustrated. In this form of the invention, the cylindrical split sleeve is considerably longer than that shown in Fig. 1. In this form of the invention similar numerals of the one hundred series indicate like or similar parts. Herein the upwardly directed portion 132 of the sleeve terminates in an upper edge 133 that contacts the arched portion of the socket. The lower end of the split sleeve is substantially the same as that previously described.

In this form of the invention also, the arcuate grooved portion in the plate, indicated by the numeral 29 in Fig. 1, is omitted and the plate 126 is flat. Also in this form of the invention, the top bearing 118 is not coaxially indented but said indentation is omitted. Likewise, the curved end 114 of the stem 111 is fully rounded and not recessed.

In this form of the invention, there is also illustrated the spring arm separation preventing plate 140 provided with the masking skirt 143. This plate and skirt, however, may be omitted or the plate may be provided but without the skirt, it being understood the plate has a dual function, to-wit, preventing separation of the socket arms and providing a continuous bearing surface for the end of the leg, the load of which is transmitted through the plate to the outwardly directed lower end portions 122 of the arms 120.

Figure 4:
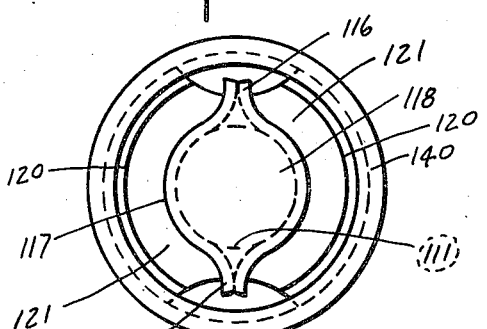
Fig. 4 is a top plan view of the invention shown in Fig. 2 with the leg omitted.
Figure 5:
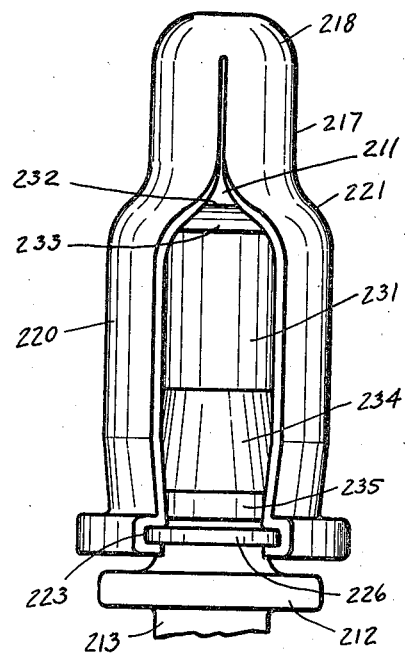
Fig. 5 is a side elevational view of a modified form of socket in which ears have been omitted.
Figure 6:
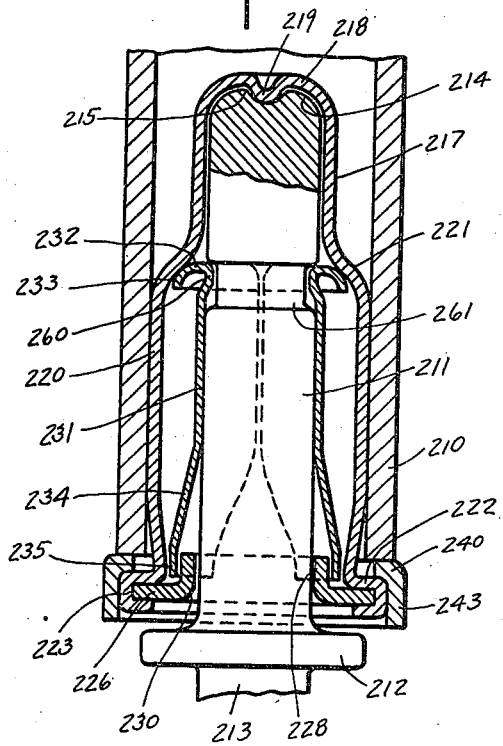
Fig. 6 is a central sectional view thereof, illustrating a positive pintle retainer construction.

In Figs. 5 and 6 is illustrated a modified form of the invention. In this form the head 218 of the socket is illustrated as indented at 219, although it may be smooth as illustrated in Fig. 2. The reduced tubular portion 217 in the present instance is not provided with the wings 16 or 116 illustrated in Figs. 3 and 4. These may be ground off or the strap metal may be pre-cut prior or drawn to socket formation.

The arched portions 221 terminate in downwardly extending arms 220, each terminating in a plate receiving groove portion 223. The plate 226 while illustrated as in Fig. 2, may be provided with the grooved portion 29, as illustrated in Fig. 1. The plate 226 is centrally apertured as at 230 and is also provided with the collar 228.

The retainer includes the split member having the substantially tubular portion 231 flaring outwardly and downwardly as at 234 and the lower end is concentric at 235 but offset from portion 231. The upper end initially is inwardly directed as at 260, thence outwardly at 232 and thence outwardly and downwardly at 233. This is the reverse from that shown in Fig. 2 wherein portion 132 flares outwardly and from that shown in Fig. 1 wherein the portion 32 flares outwardly and portion 33 extends inwardly and upwardly therefrom. The pintle 211 in the present instance has a rounded head 214 coaxially recessed at 215. Pintle 211 has the enlargement 212 and horn supporting portion 213. The pintle herein is shown provided with an annular groove 261. When the pintle is inserted in the socket, full cylindrical contact is insured if the depth of this groove is such that the innermost portion of portion 260 does not engage the root of the groove.

The shoulder formed by the upper wall of the groove engages portion 232 of the retainer to prevent dropping out of the pintle.

In this form of the invention, the arched portions 221 cooperate with portion 233 substantially as and for the purpose previously set forth relative to portion 33 shown in Fig. 1.

Figure 7:
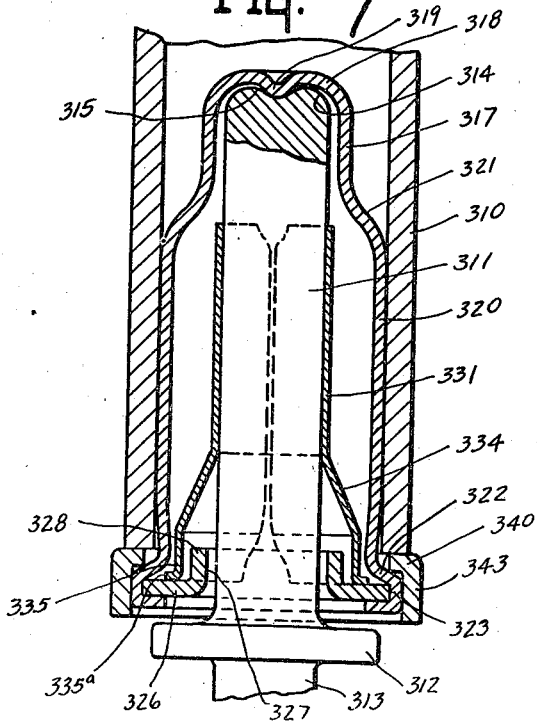
Fig. 7 is a similar view of the simplest form of the invention.

In Fig. 7 is illustrated the simplest form of the invention. This differs from the preceding forms in the omission of any angularly directed extension at the top of the pintle gripping tubular portion. In this figure similar numerals of the three hundred series indicate similar or like parts. The plate 326 while illustrated as of the form shown in Figs. 2 and 6 may be grooved as illustrated in Fig. 1 at 29. The pintle head 314 may be smooth instead of indented, as shown at 315.

In Fig. 7 the retainer is illustrated with an outwardly directed flange 335ª.

It will be apparent, therefore, that the invention, as previously described, provides a relatively elongated split, cylindrical, friction retaining sleeve for retaining a pintle in a socket and that the socket is formed so that its arched portion in all but one form cooperates with the elongated split sleeve and in all forms provides a relatively elongated closed tubular end accommodating side thrusts exerted by the pintle.

While the invention has been described in great detail in the foregoing specifications, and similarly illustrated in the drawings, the aforesaid is to be considered as illustrative and not restrictive in character and such modifications as have been suggested hereinbefore, illustrated and described, as well as many others which will readily suggest themselves to persons skilled in this art, are all considered to be within the broad scope of the invention, reference being had to the appended claims.

The invention claimed is:

1. A caster socket for tubular legs, including a socket member having a central, elongated, tubular portion terminating in a top bearing and a pair of downwardly directed arcuately sectioned arms being arranged for frictional contact with upper ends by arched portions, and outwardly extending laterally grooved lower ends, a centrally apertured plate adapted for pintle passage and seatable in the grooves, the outward extensions being arranged for lateral load support, the arms connected to the tubular portion at the the interior of a tubular leg for socket retention, and an elongated split sleeve type retainer loosely mounted within the chamber formed by the socket member and the plate for elongated cylindrical frictional contact with a pintle for detachable retention thereof.

2. A caster socket for tubular legs, including a socket member having a central, elongated, tubular portion terminating in a top bearing and a pair of downwardly directed arcuately sectioned arms connected to the tubular portion at the upper ends by arched portions, and outwardly extending laterally grooved lower ends, a centrally apertured plate adapted for pintle passage and seatable in the grooves, the outward extensions being arranged for lateral load support, the arms being arranged for frictional contact with the interior of a tubular leg for socket retention, an elongated split sleeve type retainer loosely mounted within the chamber formed by the socket member and the plate for elongated cylindrical frictional contact with a pintle for detachable retention thereof, and upwardly directed collar means upon the plate and surrounding the aperture, the lower end of the sleeve retainer nesting between the collar means and the lower ends of the arms.

3. A caster socket as defined by claim 1, characterized by the addition of a washer telescopically mounted upon the socket member for leg engagement and preventing separation of the grooved ends of the arms for plate and sleeve retention whether the socket be mounted or unmounted.

4. A caster socket as defined by claim 2, characterized by the addition of a washer telescopically mounted upon the socket member for leg engagement and preventing separation of the grooved ends of the arms for plate and sleeve retention whether the socket be mounted or unmounted.

5. A caster socket for tubular legs, including a socket member having a central, elongated, tubular portion terminating in a top bearing and a pair of downwardly directed arcuately sectioned arms connected to the tubular portion at the upper ends by arched portions, and outwardly extending laterally grooved lower ends, a centrally apertured plate adapted for pintle passage and seatable in the grooves, the outward extensions being arranged for lateral load support, the arms being arranged for frictional contact with the interior of a tubular leg for socket retention, an elongated split sleeve type retainer loosely mounted within the chamber formed by the socket member and the plate for elongated cylindrical frictional contact with a pintle for detachable retention thereof, a washer telescopically mounted upon the socket member for leg engagement and preventing separation of the grooved ends of the arms, and a laterally extending peripheral portion on the washer for masking purposes.

6. A caster socket for tubular legs, including a socket member having a central, elongated, tubular portion terminating in a top bearing and a pair of downwardly directed arcuately sectioned arms connected to the tubular portion at the upper ends by arched portions, and outwardly extending laterally grooved lower ends, a centrally apertured plate adapted for pintle passage and seatable in the grooves, the outward extensions being arranged for lateral load support, the arms being arranged for frictional contact with the interior of a tubular leg for socket retention, an elongated split sleeve type retainer loosely mounted within the chamber formed by the socked member and the plate for elongated cylindrical frictional contact with a pintle for detachable retention thereof, upwardly directed collar means upon the plate and surrounding the aperture, the lower end of the sleeve retainer nesting between the collar means and the lower ends of the arms, a washer telescopically mounted upon the socket member for leg engagement and preventing separation of the grooved ends of the arms, and a laterally extending peripheral portion on the washer for masking purposes.

7. A caster socket as defined by claim 1, characterized by the addition of a washer telescopically mounted upon the socket member for leg engagement and preventing separation of the grooved ends of the arms, and a downwardly directed skirt upon the washer for nesting therein the outward extensions on the arms and laterally contracting said extensions.

8. A caster socket as defined by claim 2, characterized by the addition of a washer telescopically mounted upon the socket member for leg engagement and preventing separation of the grooved ends of the arms, and a downwardly directed skirt upon the washer for nesting therein the outward extensions on the arms and laterally contacting said extensions.

9. A caster socket for tubular legs, including a socket member having a central, elongated, tubular portion terminating in a top bearing and a pair of downwardly directed arcuately sectioned arms connected to the tubular portion at the upper ends by arched portions, and outwardly extending laterally grooved lower ends, a centrally apertured plate adapted for pintle passage and seatable in the grooves, the outward extensions being arranged for lateral load support, the arms being arranged for frictional contact with the interior of a tubular leg for socket retention, and an elongated split sleeve type retainer within the socket member for elongated cylindrical frictional contact with a pintle for retention thereof, the elongated split sleeve type retainer having an elongated inner and intermediate tubular portion and outwardly and oppositely directed end portions.

10. A caster socket for tubular legs, including a socket member having a central, elongated, tubular portion terminating in a top bearing and a pair of downwardly directed arcuately sectioned arms connected to the tubular portion at the upper ends by arched portions, and outwardly extending laterally grooved lower ends, a centrally apertured plate adapted for pintle passage and seatable in the grooves, the outward extensions being arranged for lateral load support, the arms being arranged for frictional contact with the interior of a tubular leg for socket retention, and an elongated split sleeve type retainer within the socket member for elongated cylindrical frictional contact with a pintle for retention thereof, the elongated split sleeve type retainer having an elongated inner and intermediate tubular portion and outwardly and oppositely directed end portions, the upper outwardly directed end portion having an upwardly and inwardly directed extension, the outer upper surface thereof substantially conforming to the arched portion of the socket member.

11. A caster socket for tubular legs, including a socket member having a central, elongated, tubular portion terminating in a top bearing and a pair of downwardly directed arcuately sectioned arms connected to the tubular portion at the upper ends by arched portions, and outwardly extending laterally grooved lower ends, a centrally apertured plate adapted for pintle passage and seatable in the grooves, the outward extensions being arranged for lateral load support, the arms being arranged for frictional contact with the interior of a tubular leg for socket retention, and an elongated split sleeve type retainer within the socket member for elongated cylindrical frictional contact with a pintle for retention thereof, the elongated split sleeve type retainer having an elongated inner and intermediate tubular portion and outwardly and oppositely directed end portions, the upper outwardly directed end portion having an upwardly and inwardly directed extension, the outer upper surface thereof substantially conforming to the arched portion of the socket member, the lower outwardly directed end portion terminating in a substantially concentric but coaxial offset portion relative to the intermediate tubular portion.

12. A caster socket for tubular legs, including a socket member having a central, elongated, tubular portion terminating in a top bearing and a pair of downwardly directed arcuately sectioned arms connected to the tubular portion at the upper ends by arched portions, and outwardly extending laterally grooved lower ends, a centrally apertured plate adapted for pintle passage and seatable in the grooves, the outward extensions being arranged for lateral load support, the arms being arranged for frictional contact with the interior of a tubular leg for socket retention, an elongated split sleeve type retainer within the socket member for elongated cylindrical frictional contact with a pintle for retention thereof, and means at the upper portion of the sleeve for cooperation with a pintle structure for preventing a pintle from dropping out of the socket but permitting forcible removal of the pintle therefrom.

13. A socket as defined by claim 9, characterized by the lower outwardly directed end portion of the retainer terminating in a substantially concentric but coaxially offset portion.

14. A caster socket for tubular legs including a socket member having a central elongated tubular portion, a plurality of downwardly directed arms connected at their upper ends to the tubular portion lower end by arched portions, a centrally apertured plate adapted for pintle reception, the plate aperture and tubular portion being coaxial for lateral confinement of the pintle, and a cooperative connection between said plate and the lower ends of the arms, said socket member being adapted for tubular leg reception, the arms when received by the leg frictionally retaining the socket, and an elongated split, sleeve type retainer loosely mounted within the chamber formed by the socket member and plate for elongated frictional contact with a pintle for detachable retention thereof, said sleeve having an outwardly flared lower end, and its upper end terminating adjacent the arched portions.

15. A caster socket for tubular legs including a socket member having a central elongated tubular portion, a plurality of downwardly directed arms connected at their upper ends to the tubular portion lower end by arched portions, a centrally apertured plate adapted for pintle reception, the plate aperture and tubular portion being coaxial for lateral confinement of the pintle, and a cooperative connection between said plate and the lower ends of the arms, said socket member being adapted for tubular leg reception, the arms when received by the leg frictionally retaining the socket, an elongated split, sleeve type retainer loosely mounted within the chamber formed by the socket member and plate for elongated frictional contact with a pintle for detachable retention thereof, said sleeve having an outwardly flared lower end, and its upper end terminating adjacent the arched portions, and upwardly directed collar means upon the plate and surrounding the aperture, the lower end of the sleeve retainer nesting between the collar means and the lower ends of the arms.

16. A socket as defined by claim 14, characterized by the addition of a washer having a skirt projecting over and masking the connection between the arms and the apertured plate.

17. A socket as defined by claim 15, characterized by the addition of a washer having a skirt projecting over and masking the connection between the arms and the apertured plate.

CLARENCE B. NOELTING.
WILLIAM H. NOELTING.